June 19, 1923.
A. MÉLOTTE
SPEED INDICATOR
Filed June 26, 1922
1,459,292
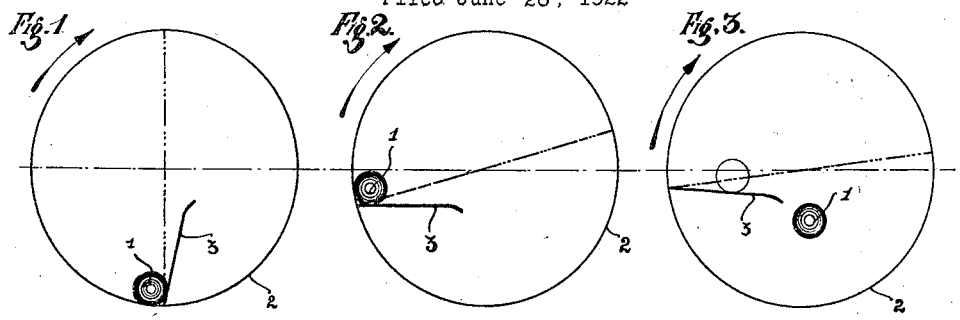
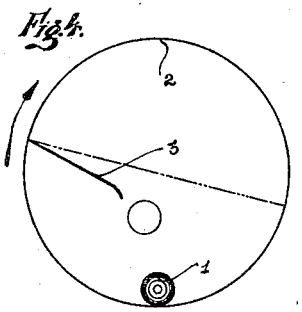
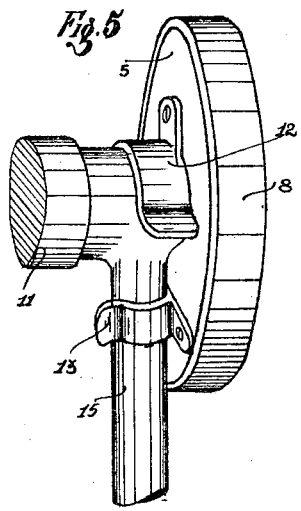
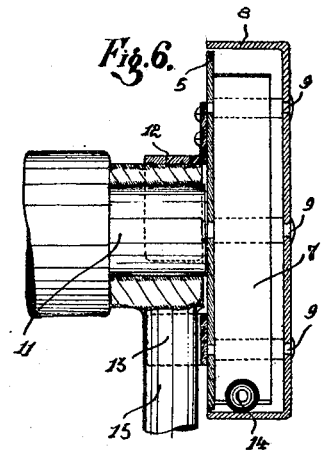
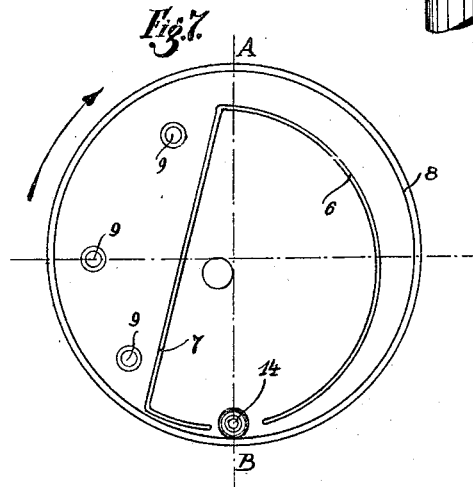
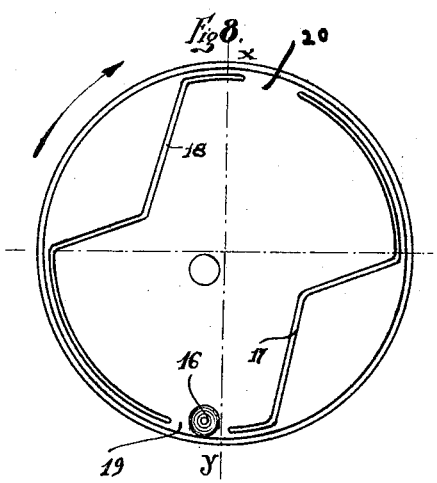
Inventor:
Alfred Mélotte
By [signature]
Attorney Patented June 19, 1923.

1,459,292

UNITED STATES PATENT OFFICE.

ALFRED MÉLOTTE, OF REMICOURT, BELGIUM.

SPEED INDICATOR.

Application filed June 26, 1922. Serial No. 570,900.

*To all whom it may concern:*

Be it known that I, ALFRED MÉLOTTE, subject of the King of Belgium, residing at Remicourt, in the Kingdom of Belgium, have invented certain new and useful Improvements in or Relating to Speed Indicators, of which the following is a specification.

This invention relates to an apparatus for indicating speed by means of sound, comprising a ball which is movable inside a rotary bell.

In apparatus of this kind as hitherto used, the ball, which was arranged in a radial groove of a plate rigidly connected with the bell, had during the rotation of the latter, an alternating movement due to the action of gravity so long as the centrifugal force due to the movement of rotation of the above-mentioned bell did not throw the ball against the wall of the bell.

Such arrangements based upon the action of the centrifugal force necessitate a fairly high speed of the rotation in order to hold the ball against the wall of the bell.

It follows that in order to permit the apparatus to be used with low speed machinery such as cream separators, it is necessary that it be placed at a certain distance from the rotating shaft, i. e., upon the driving handle.

According to the present invention, the motion of the ball which gives the speed indication is due to gravity alone, and the apparatus may be placed upon the hub of the driving shaft. To this end the ball is carried around at each revolution by means of a member rigidly connected with the bell, then is abandoned to itself. The said carrying member may consist, for instance, of a blade arranged inside a drum in which the ball is displaced.

According to the more or less high speed of rotation of the bell, which is rigidly connected with the shaft of the machine, the ball falls at various points of the periphery of the bell. By placing a non-sonorous body in different suitably chosen points of the periphery, the impact of the said ball will produce a sound only for certain well predetermined points of fall corresponding to known speeds.

According to another mode of carrying the invention into effect, the bell may be provided with several members for driving the ball, which members act successively upon the ball in such a manner that it falls several times upon the bell during each revolution.

The accompanying drawings illustrate by way of example two modes of carrying the invention into effect.

Figures 1, 2, 3 and 4 are diagrams of the apparatus showing the successive positions of the ball during the rotation of the drum.

Fig. 5 is a perspective view of one construction.

Fig. 6 is a section of the apparatus along the line A—B of Fig. 7.

Fig. 7 illustrates a section of the apparatus along the line C—D of Fig. 6.

Fig. 8 illustrates a sectional view of the second construction.

As shown more particularly in Figs. 1 to 4, the ball 1 rolls freely against the wall of the rotating drum 2, which is provided on its inside with a blade 3 (see Fig. 1).

When the drum rotates in the direction indicated by the arrow, the ball is raised by the blade until the latter is horizontal (see Fig. 2).

As the rotation of the drum continues, the blade becomes inclined and allows the ball to escape by rolling to the end of the blade where it falls off and drops down upon the bottom wall of the drum, following a line which is practically vertical. As the rotation of the drum still continues during the free fall of the ball, it is easily understood that, as shown in Figs. 3 and 4, the ball will fall on different points of the wall of the drum according to the more or less high speed of rotation of the latter.

It is by choosing the point of the drum for which the fall of the ball gives a sound that the arrangement shown in the diagram permits of giving a speed indication.

According to the mode of construction which is illustrated in Figs. 5, 6 and 7, the apparatus consists of a plate 5, on which is fixed a drum comprising a curved part 6 and a straight part 7. The said straight part 7 forms the blade which raises the ball 14; and in the case of its application to an apparatus for working at given speeds, there are no drawbacks in extending in a straight line the blade shown in the above-mentioned diagrams.

A bell 8 is fixed to the plate 5 by means of three strong rivets 9. These three rivets are arranged in the part which the ball 14 cannot reach, so that its movement shall not be impeded. The apparatus is fixed directly upon the driving shaft 11 by means of two resilient lugs 12 and 13, which embrace respectively the shaft 11 and the crank or handle 15.

According to another mode of construction illustrated in Fig. 8, the drum comprises two straight walls 17 and 18 acting as blades and lifting successively the ball 16. As the two notches or openings 19 and 20 are not symmetrically arranged relatively to the axis X Y, the ball will fall into each of them only for different speeds, leaving between them a speed for which the ball will not fall into either of the two notches and will not, therefore, give any sound.

It is obvious that a larger number of blades lifting the ball at each revolution may be used, and that the notches may be arranged in various ways. For instance, they may be arranged in such a manner as to have two shocks per revolution for the normal speed or for low speed, one shock for normal speed, then no sound when the maximum speed has been reached.

I claim—

1. An apparatus for indicating speed by means of sound, comprising a rotary shaft; a hollow resonant body mounted thereon; a hollow non-resonant body within the interior of the resonant body fixed to said shaft to rotate therewith and having at least one outlet opening; and an impact body freely rotatable within the non-resonant body and adapted to escape through said opening and fall against the resonant body when said shaft and said non-resonant body are rotating at speeds lower than a predetermined speed.

2. An apparatus for indicating speed by means of sound, comprising a drum provided on its inside with a blade carrying a ball and abandoning it to itself after it has been lifted to a certain angle; the said ball, when falling, striking the periphery of the said drum at a point at which depends on the speed of rotation of the said drum which is protected at certain parts of the circumference against the shock of the ball by means of a non-sonorous body.

3. An apparatus for indicating speed by means of sound, comprising a drum provided on its inside with several driving members carrying a ball and abandoning it to itself after it has been lifted to a certain angle; the said ball, when falling, striking the periphery of the said drum at a point which depends on the speed of rotation of the said drum.

4. An apparatus for indicating speed by means of sound, comprising a rotary shaft; a hollow resonant body mounted thereon; a hollow non-resonant body within the interior of the resonant body fixed to said shaft to rotate therewith and having at least one blade and one outlet opening; and an impact body freely-rotatable within the non-resonant body and adapted to be lifted up by said blade and then to be dropped therefrom when the blade reaches a certain angular position, and to escape through said opening and fall against the resonant body when said shaft and said non-resonant body are rotating at speeds lower than a predetermined speed.

In testimony whereof I affix my signature.

ALFRED MÉLOTTE.

Witnesses:
GEORGES VANDER HOEGHEN,
LEONARD LERON.